Figure 1:
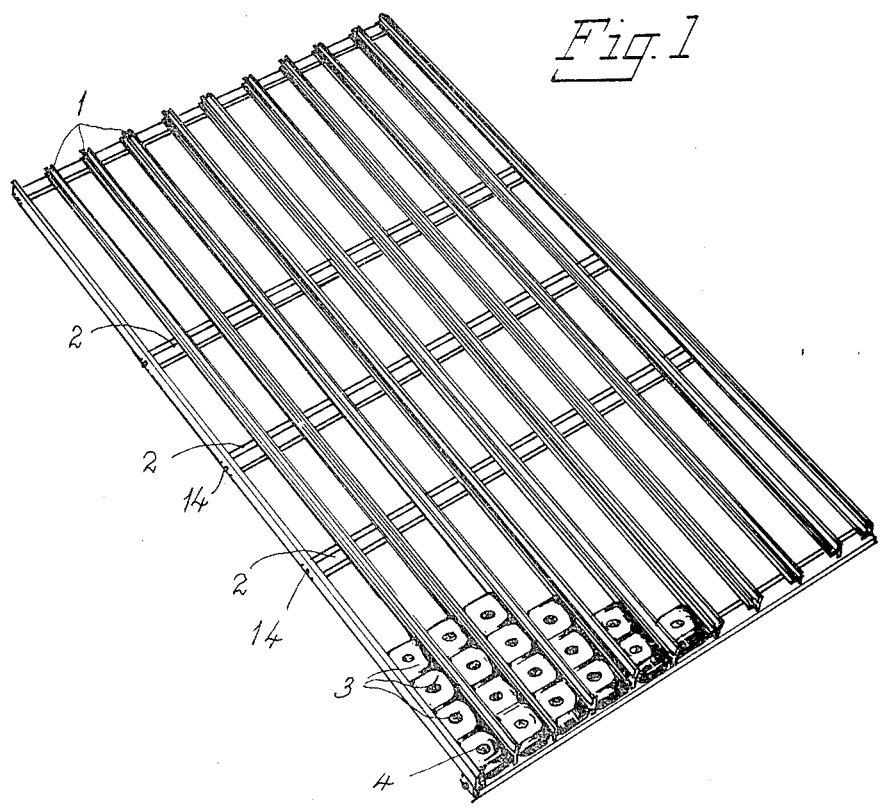

United States Patent [19]

Heinstedt

[11] 4,251,951
[45] Feb. 24, 1981

[54] METHOD IN CULTIVATION OF PLANTS AND PLANTING THEM, AS WELL AS MEANS FOR CARRYING OUT THE METHOD

[76] Inventor: David Heinstedt, Gärdstuguvägen 27, S-191 51 Sollentuna, Sweden

[21] Appl. No.: 963,047

[22] Filed: Nov. 22, 1978

[30] Foreign Application Priority Data

Nov. 23, 1977 [SE] Sweden ............................. 7713240

[51] Int. Cl.³ .............................................. A01G 9/02
[52] U.S. Cl. ........................................ 47/39; 47/77; 47/85; 47/64; 211/126
[58] Field of Search .............. 211/126; 47/59–65, 47/84–87, 77, 39

[56] References Cited

U.S. PATENT DOCUMENTS

| 3,703,050 | 11/1972 | Edwards | 47/84 |
| 3,938,281 | 2/1976 | Ingerstedt | 47/84 X |
| 3,971,160 | 7/1976 | Vajtay | 47/84 |
| 3,971,629 | 7/1976 | Buix et al. | |

FOREIGN PATENT DOCUMENTS

| 7406925 | 11/1975 | Netherlands | 47/87 |
| 1184790 | 3/1970 | United Kingdom | 47/84 |

*Primary Examiner*—Robert E. Bagwill
*Attorney, Agent, or Firm*—Fred Philpitt

[57] ABSTRACT

The present invention is concerned with a method in cultivating plants, especially forestry plants, and planting them. In this connection the plants are cultivated in slabs of a cultivating medium such as compressed peat, e.g. Sphagnum peat, with an air space underneath. The slabs provided with seeds for germination are mounted firmly, but removably on support frames provided with supporting rails, said frames together with corresponding stackable transport or carrier frames, being placed on a substructure with an air space between the substructure and the slab. After germination, the support frames with the plants are stacked in their associated transport frames one above the other. After possible intermediate storage, the stack of transport and support frames are transported to the planting site with the plants substantially undisturbed in the cultivating medium on the support frames. The invention is also concerned with a means for carrying out the method.

6 Claims, 4 Drawing Figures

U.S. Patent  Feb. 24, 1981  Sheet 2 of 2  4,251,951
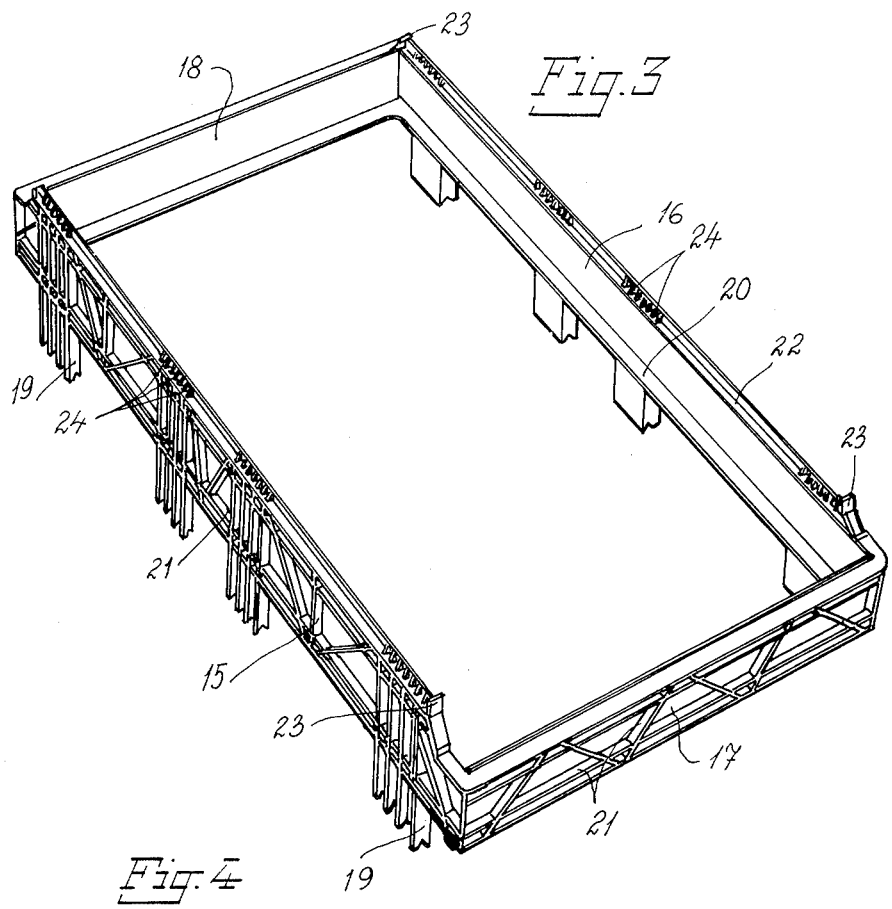
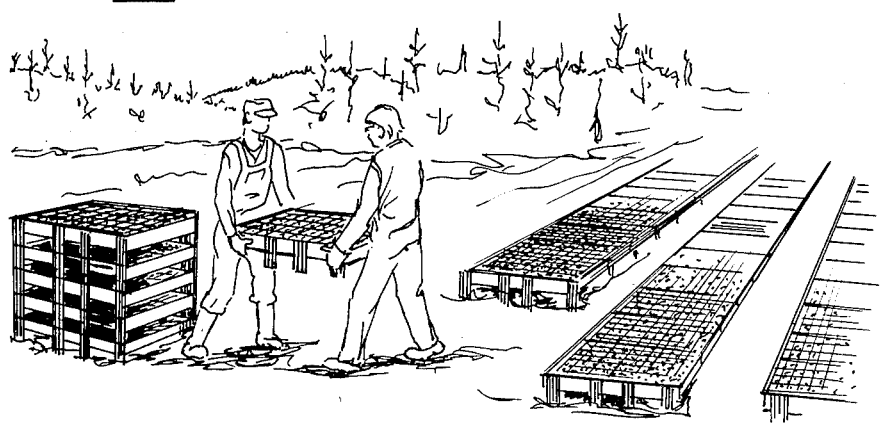

METHOD IN CULTIVATION OF PLANTS AND PLANTING THEM, AS WELL AS MEANS FOR CARRYING OUT THE METHOD

The present invention relates to a method in cultivating plants and planting them. More exactly, the invention relates to a method of cultivating plants and planting them wherein the plants are cultivated in slabs of cultivating medium with an air space underneath and the plants thus obtained, together with the slabs of cultivating medium, are later on transported to a planting site. The invention also relates to a means for carrying out the method.

Such methods are already known. Accordingly, it is known to use slabs of compressed peat, e.g. Sphagnum peat, as cultivating medium for seeds of different forestry plants. The slab is encased in an envelope of thermoplastic material, for example, there being openings at the upper and lower sides of the envelope. The upper opening is intended for providing space for the forestry plant to shoot up out of the cultivating medium on germination, and the lower one enables so-called air space cultivation, the purpose of which is to prevent the roots formed on germination from going out of the side of the slab. When it is desired to achieve germination, the enveloped slab is placed so that there is an air space between it and the ground. On supplying it with water, the material in the slab is caused to swell and germination soon takes place. The envelope surrounding the cultivation substrate serves inter alia as an obstacle to rapid drying-out of the slab, and furthermore as a means for attaining heat absorption to increase the temperature of the cultivating substrate, as well as to increase the temperature of the ground beneath it after the slab has been planted out.

The present invention is directed to obtaining a method of handling a large number of cultivating slabs of the type mentioned, from the time they are placed out with a space between them and the ground, so that the seeds planted therein shall germinate, to the time when the plants obtained after germination has been transported to the place where they shall be planted. The invention is thus characterized in that such measures are taken in a mode as given above that the slabs planted with seeds are firmly but removably placed on supporting rails in support frames for the purpose of germination, said support frames together with corresponding stackable carrying transport frames being placed on a substructure with an air space between the substructure and the slabs, and in that the support frames with the plants obtained after germination are stacked in their respective stackable carrying transport frames one above the other, and after possible intermediate storage are transported to the planting site with the plants substantially undisturbed in the cultivating medium in the support frames.

The invention also relates to means for cultivating plants and planting them. The means are preferably, but not exclusively intended to be used in carrying out the method described above. The means are characterized in that they comprise one or more support frames provided with rails, intended to serve as supports for slabs of cultivating substrate during the cultivation of the plants, with an air space between the substrate and slab, and that each support frame removably fits into a stackable transport frame, the latter with their associated support frames being compactly stackable one on top of the other for transporting the plants to the planting site, and the return transport of the frames therefrom.

According to one embodiment of the invention, the support frame is composed of supporting rails. These supporting rails may present side flanges starting and projecting from a central portion and being provided with carrying means for removably placed cultivating slabs with an envelope.

According to a further embodiment of the invention, the rails may present lower and upper side flanges, a lower flange and an upper flange on the same side of a central portion of the rail, said latter flanges forming a mounting for a cultivating slab.

According to still another embodiment of the invention, the upper side flanges may form an angle between 20° and 90° with a vertical plane through the central portion.

Figure 2:
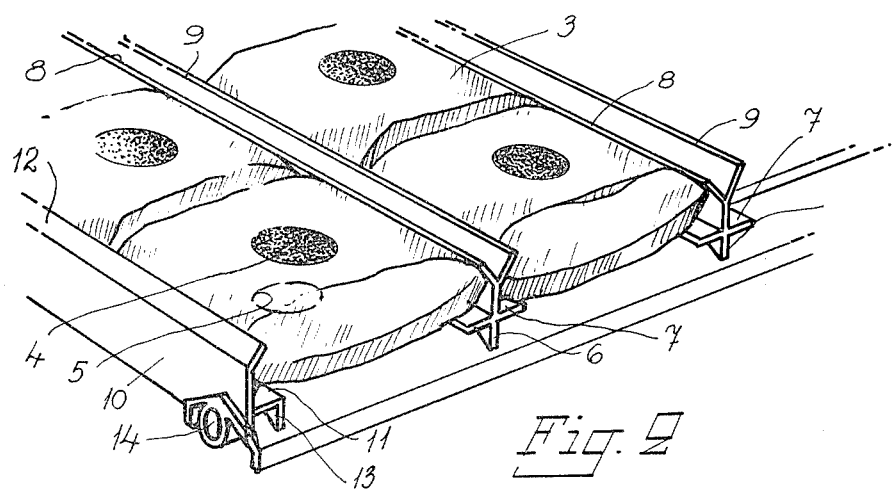

The invention will now be described in the following while referring to the accompanying drawings, where FIG. 1 shows a perspective view of a support frame for a large number of cultivating slabs in their plastic envelopes, FIG. 2 shows an enlarged perspective view of the support frame shown in FIG. 1 with cultivating slabs mounted firmly but removably therein, FIG. 3 shows a perspective view of a stackable transport frame for the supporting frame shown in FIGS. 1 and 2, and FIG. 4 shows how a plurality of transport frames with corresponding, associated support frames are stacked to form a transport unit and it also shows how the transport frames are placed one by one on the ground for achieving germination.

In FIG. 1, the support frame has the shape of a rectangular grid, comprising a plurality of parallel supporting rails 1. These are kept together with the help of a plurality of transverse rails 2. In the embodiment shown, the supporting rails 1 have the shape of a cross in cross-section, one portion of the cross being vertical and the other horizontal.

In pairs, the supporting rails 1 serve as supporting elements for a plurality of cultivating slabs 3 placed in a row, these slabs consisting of compressed peat enveloped in thermoplastic sheet, and each slab has been provided with a seed which is caused to germinate later, after the slab has been arranged on the ground with an air space between the underside of the slab and the ground. On each slab there is an opening 4 in the upper side of the thermoplastic envelope, and an opening 5 on its underside. The opening 4 is intended to enable the growing plant to thrust up from the cultivating substrate after the seed has germinated, while the opening 5 on the underside serves the purpose known per se of preventing developing roots from working their way out of the slab-like cultivating substrate.

Also in FIG. 2 the cultivating slab with its envelope is denoted by the numeral 3. The flange portion 6 of the supporting rail 1, corresponding to the vertical portion of the cross, is firmly inserted into recesses in the transverse rails and rigidly attached therein, while the flange portion 7 of the same rail 1, corresponding to the horizontal portion, serves as one support structure for a cultivating slab of compressed part with its envelope, while an opposing horizontal part of the cross in a parallel and adjacent rail serves as the other support structure. There are two flanges 8 and 9 joined together to form a V with its apex downwardly connected to the vertical portion 6 of the support rail. One flange 8 and its associated flange portion 7, corresponding to the horizontal portion of the cross formed in cross-section by the support rail 1, form a mounting for a cultivating slab 3 at one side, while an opposingly directed flange 9 and its associated flange portion 7, corresponding to the horizontal portion of the cross in an adjacent support rail, form the mounting for the same slab on its other side. Both mountings retain the slab 3 glidably removable on the support rails. By this construction with flanges on each support rail, it is possible to move the slabs along both supporting structures, even after the material in the slabs has been caused to swell by being watered. Each rail 10, outmost in the frame, is formed in principle as a half of one of the more central rails. In other words, it has one horizontal flange 11 and an upwardly inclined flange 12. The horizontal flange has however been provided with a further downward vertical flange 13 to reinforce the structure. The frame is transversely reinforced with reinforcing bars 14.

To enable rational handling of the support frames with the cultivating slabs glidably removable therein, there are used stackable transport frames of the kind shown in FIG. 3. Each such frame comprises two long sidepieces 15, 16 and two short sidepieces 17, 18, and is carried by eight feet, the left-hand forward foot in the Figure being denoted by the numeral 19. The transport frame is downwardly provided on its inside with a stringer 20, going all the way round. To make it more stable, the frame is also provided with a number of built-in reinforcing elements 21 on the outside. Each long sidepiece has a ridge 22 on its upper side of enable stacking a plurality of transport frames with or without support frames in each transport frame. At each end of the ridges 22 there is a stop 23, each ridge being also provided in four places with V-shaped reinforcing pieces 24. On the underside of each foot 19 there are V-shaped recesses complementary to the pieces 24. Both outermost feet on each long sidepiece are so placed that when two frames are stacked one above the other, the outer edges of the feet abut a stop 23, thus preventing displacement of the frames in relation to each other. Since each foot has a V-shaped recess, allowing it to be easily located to the corresponding group of supporting pieces 24, stacking the frames is facilitated.

As is apparent from FIG. 3, the forward short sidepiece 18 has less height than the long sidepieces and the opposing short sidepiece 17. Spaces are thus formed, when a plurality of frames are stacked one above the other, into which a support frame with its cultivating slabs can be thrust so that the support frame can come to rest on the stringer 20 of the transport frame. In conjunction with planting-out cultivating slabs with their upstanding plants, it will also be easy selectively to take out a support frame, with the removably mounted slabs, from one of several transport frames forming a transport unit, for either manually or automatically placing the slabs at places where it is desired that a tree will eventually grow.

A support frame as shown in FIG. 1 and a transport frame corresponding thereto as shown in FIG. 3 are used such that the support frame is first charged with a plurality of cultivating slabs 3 consisting of compressed peat with an embedded seed and a plastic envelope. This process can be carried out at an installation for manufacturing the slabs. The support frames with associated carrying frames are then transported to a place where plants are to be cultivated. In cultivation, the feet 19 of each transport frame serve to provide an air space between the underside of the cultivating slabs 3 and the substrate on which the transport frames with their support frames have been distributed. Because of the special design of the mounting of the cultivating slabs 3, these withstand transport without being liberated from engagement between the support rails 1. The transport unit and distribution of the frames in it are shown in FIG. 4. The slabs are watered in conjunction with cultivating the plants, with the result that the compressed peat of which they are formed swells. In spite of this swelling and the increase in volume of each slab thus caused, the glidability of the slab on the support rails is maintained. After the seeds in the cultivating slabs have germinated and a plant has grown up, without the roots thrusting out on the underside into the air space, the transport frames and support frames are assembled into transport units as shown to the left in FIG. 4 and are driven out, after possible intermediate storage, to the place where the plants are to be planted. Each support frame is then taken from the transport unit via the space formed by the short sidepiece 18 having diminished height. The plants can then be planted manually or automatically. In spite of the alterations in the condition of the peat during cultivation of the plants, the slabs will be very easy to displace along the supporting rails and can be easily removed therefrom.

What is claimed is:

1. Apparatus for facilitating the cultivation and planting of a plurality of plants, each plant growing on its own slab of a cultivating substrate, said apparatus including a plurality of vertically stackable units, each unit comprising:
    (a) a support frame that includes a plurality of spaced apart parallel rails, each rail having opposed upper and lower portions forming a concavity therebetween, whereby a pair of said rails is adapted to slideably receive and support a plurality of cultivating slabs therebetween, said lower portions serving to support the outer edges of said slabs and said upper portions serving to prevent upward movement of said slabs, and
    (b) a transport frame in which said support frame is removably mounted, said transport frame being compactly and vertically stackable with at least one adjacent transport frame, and each transport frame having spacing means for vertically spacing it far enough away from each adjacent transport frame so that plants growing on said slabs will have sufficient air space and be substantially undisturbed.

2. Apparatus for facilitating the cultivation and planting of a plurality of plants, each plant growing on its own slab of a cultivating substrate, said apparatus including a plurality of vertically stackable units, each unit comprising:
    (a) a support frame that includes a plurality of spaced apart parallel rails, each rail except the end rails including a pair of horizontal flange portions and extending upwardly therefrom and substantially equidistantly thereof an upper flange portion which is substantially Y-shaped, whereby a pair of said rails is adapted to slideably receive and support a plurality of cultivating slabs therebetween, said horizontal flange portions serving to support the outer edges of said slabs, said upper flange portions serving to prevent upward movement of said slabs, and (b) a transport frame in which said support frame is removably mounted, said transport frame being compactly and vertically stackable with at least one adjacent transport frame, and each transport frame having spacing means for vertically spacing it far enough away from each adjacent transport frame so that plants growing on said slabs will have sufficient air space and be substantially undisturbed.

3. An apparatus according to claim 2 wherein said flanges form an angle of 20°–90° with respect to the vertical.

4. An apparatus according to claim 1 or 2 wherein said transport frame is rectangular in overall configuration having a stringer extending around its interior for supporting said supporting frame and said spacing means comprises a plurality of feet around the periphery of said rectangular frame.

5. An apparatus according to claim 4 wherein said feet have V-shaped slots in order to facilitate stacking.

6. An apparatus according to claim 4 wherein the upper part of said transport frame includes a plurality of upstanding supporting pieces upon which the feet of a transport frame placed thereabove can rest.

* * * * *